J. TOPALIAN.
VEGETABLE CUTTING APPARATUS.
APPLICATION FILED MAR. 16, 1917.

1,263,151.

Patented Apr. 16, 1918.
6 SHEETS—SHEET 3.

Witnesses:
Dorothy Miatt

Inventor:
John Topalian,
By his Attorney,
Geo. Wm. Miatt

J. TOPALIAN.
VEGETABLE CUTTING APPARATUS.
APPLICATION FILED MAR. 16, 1917.
1,263,151.
Patented Apr. 16, 1918.
6 SHEETS—SHEET 4.
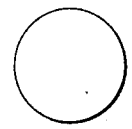
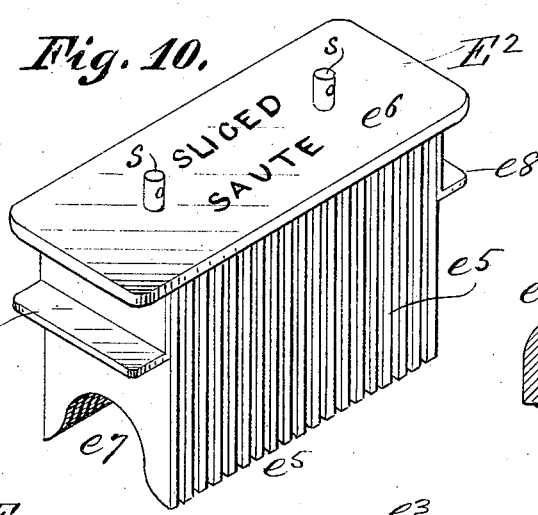
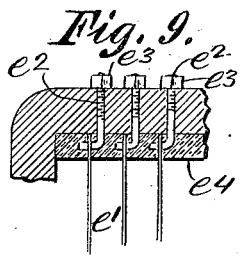
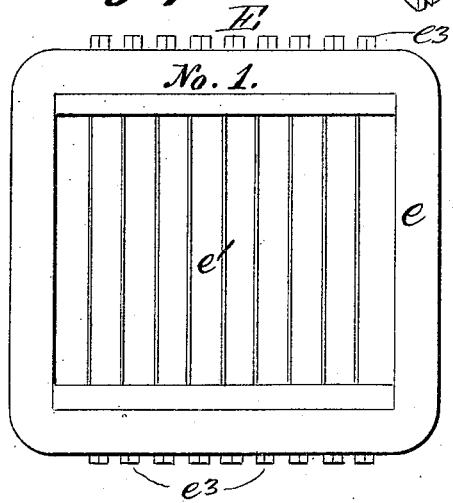
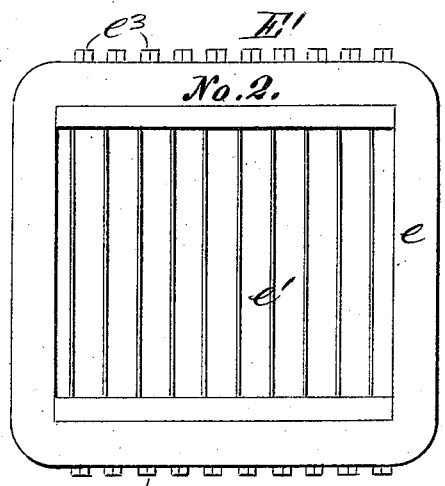
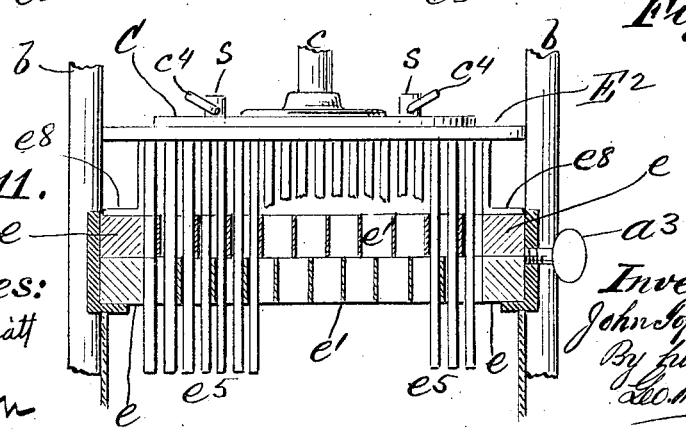

J. TOPALIAN.
VEGETABLE CUTTING APPARATUS.
APPLICATION FILED MAR. 16, 1917.

1,263,151.

Patented Apr. 16, 1918.
6 SHEETS—SHEET 5.

Witnesses:
Dorothy Miatt
J. W. Pirrum

Inventor:
John Topalian,
By his Attorney
Geo. Wm. Miatt

J. TOPALIAN.
VEGETABLE CUTTING APPARATUS.
APPLICATION FILED MAR. 16, 1917.
1,263,151.
Patented Apr. 16, 1918.
6 SHEETS—SHEET 6.
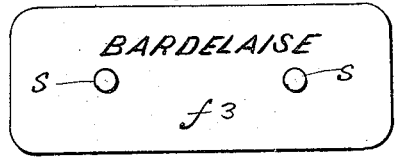
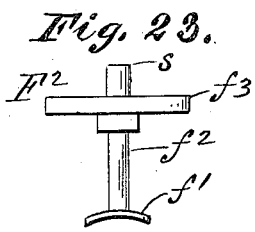
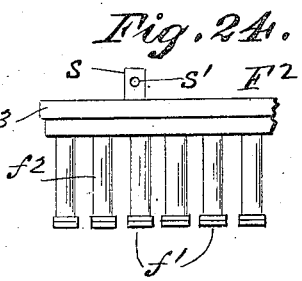
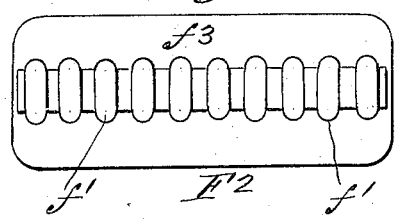
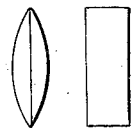
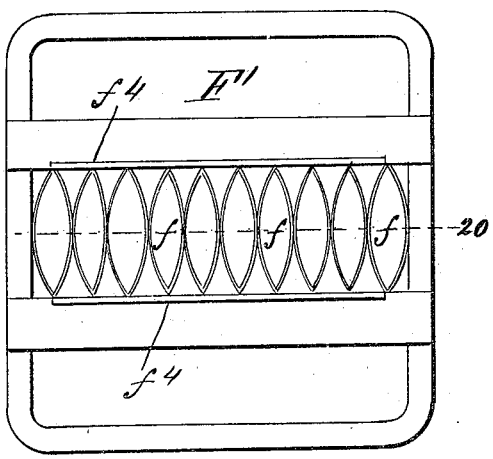
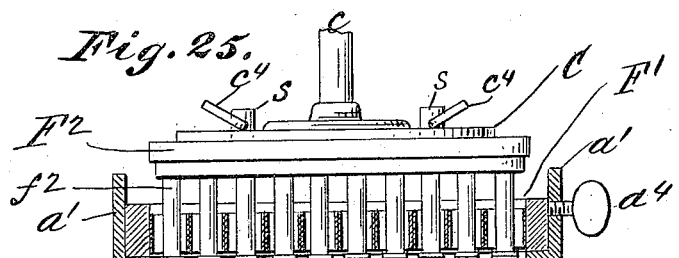
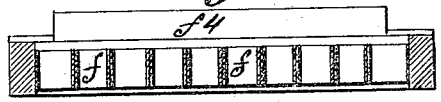

UNITED STATES PATENT OFFICE.

JOHN TOPALIAN, OF NEW YORK, N. Y.

VEGETABLE-CUTTING APPARATUS.

1,263,151.

Specification of Letters Patent.

Patented Apr. 16, 1918.

Application filed March 16, 1917. Serial No. 155,167.

*To all whom it may concern:*

Be it known that I, JOHN TOPALIAN, a subject of the Sultan of Turkey, and a resident of the borough of Manhattan, city, county, and State of New York, have invented certain new and useful Improvements in Vegetable-Cutting Apparatus, of which the following is a specification.

While applicable to the cutting and shaping of certain other vegetables such as turnips, carrots and the like, having parts of more or less solid consistency, my apparatus is designed more particularly for the cutting and shaping of potatoes into the various forms required for use in hotels and restaurants, etc., such as saute, German cut, French fried, château, rissolee, bardelaise, etc. Heretofore, so far as I am aware, these and other shapes have all been cut by hand with the exception of "French fried," the long strips for which were made by forcing the potato through a die having openings square in cross section. The cutting by hand is slow and laborious, and has to be done by skilled labor which adds materially to the cost of production.

It is the main object of my invention to reduce the cost of production to a minimum, and at the same time to attain greater exactness and uniformity in the shape of product; and the invention consists in the specific construction and arrangements of parts described and claimed,—distinctive features being the press formed with a die seat for interchangeable female dies, and with a reciprocatory pusher head adapted to support the various male dies, strippers, etc., together with said male and female dies, strippers, etc., all as hereinafter fully set forth.

In the accompanying drawings,

Fig. 7, is a plan of the No. 1, parallel blade female die;

Figure 15:
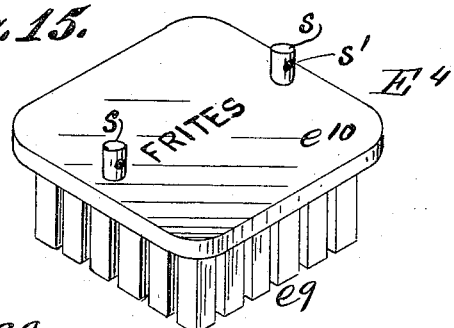
Figure 16:
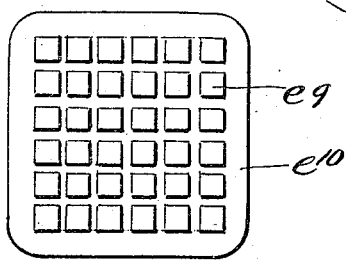
Figure 18:
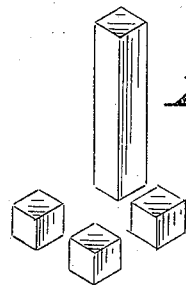
Figure 13:
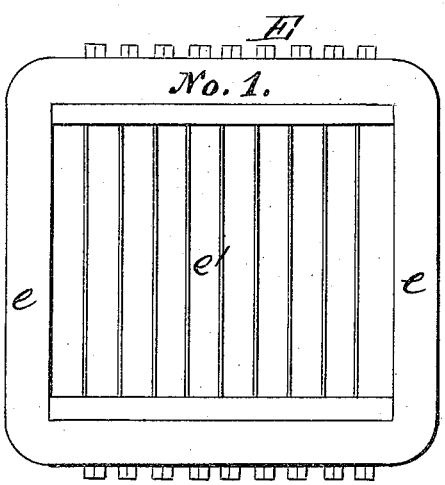
Figure 14:
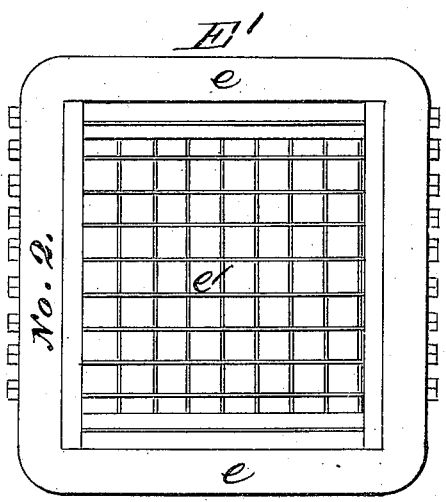
Figure 17:
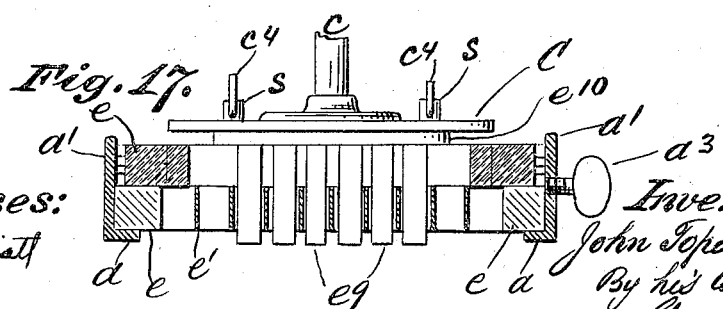

Fig. 8, a similar view of the No. 2, parallel blade female die;

Fig. 9, a sectional detail view showing the method of securing the parallel blades in position;

Fig. 10, is an isometrical perspective of the male die or stripper used in conjunction with the aforesaid parallel blade dies;

Fig. 11, is a sectional elevation showing the parallel blade dies seated in the press, and the male die or stripper at the completion of its downward stroke, some of the stripping plates being broken away;

Fig. 12, shows the thickness of the products obtained by the use of the parallel blade dies;

Fig. 13, is a plan of the No. 1, parallel knife female die before the application thereto of the corresponding No. 2, die;

Fig. 14, is a plan of the two parallel knife dies, the No. 2, die being superposed on the No. 1, die, to form square apertures;

Fig. 15, is an isometrical perspective of the male die or stripper used in conjunction with the parallel blade dies as crossed in Fig. 14;

Fig. 16, is a view of the under side of said last mentioned die or stripper;

Fig. 17, is a sectional view of the blade dies seated in the press and crossed with relation to each other as in Fig. 14, with their male die or stripper in its lowest position;

Fig. 18, illustrates the products attained by the use of the crossed parallel blade dies;

Fig. 19, is a plan of the female "Bardelaise" die, or die for cutting of convex-sided pieces;

Fig. 20, is a section taken upon plane of line 20—20, Fig. 19;

Fig. 21, is a top view of the male die or "Bardelaise" stripper;

Fig. 22, is a view of the under side thereof;

Fig. 23, is an end view thereof;

Fig. 24, is a side elevation of a portion thereof;

Fig. 25, is a sectional view showing the Bardelaise die seated in the press, and the stripper extending through the matrices of the female die;

Fig. 26, shows the shape of the product of the Bardelaise matrices,

The press P, is mounted upon a suitable table or base B, supported upon a leg or pedestal B', or in any other suitable manner. Rigidly attached to the base B, are four standards $b$, $b$, united integrally at top by a cross head $b'$. Rigidly attached to and between the standards $b$, $b$, and intermediate between the base B, and the cross head $b'$, is the seat for the support of the female dies used in shaping the potato or other vegetable products. For convenience I shall hereinafter confine my description to the formation and manipulation of potato products with the understanding that I am not limited thereto, since other vegetables may be so treated as before stated.

The female die seat consists essentially of the horizontal flanges $a$, and vertical walls or flanges $a'$, the horizontal flanges $a$, being formed with notches or recesses $a^2$, for the purpose hereinafter set forth.

Figure 2:
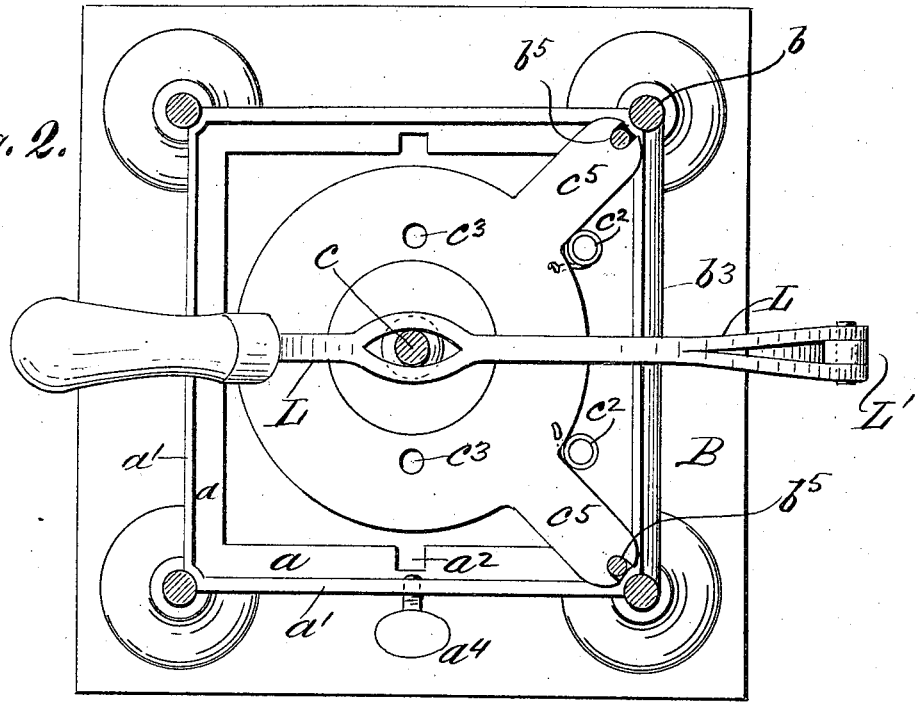
Fig. 2, is a horizontal section thereof, taken on a plane immediately below the cross head which unites the upper ends of the corner standards, and looking downward.
Figure 3:
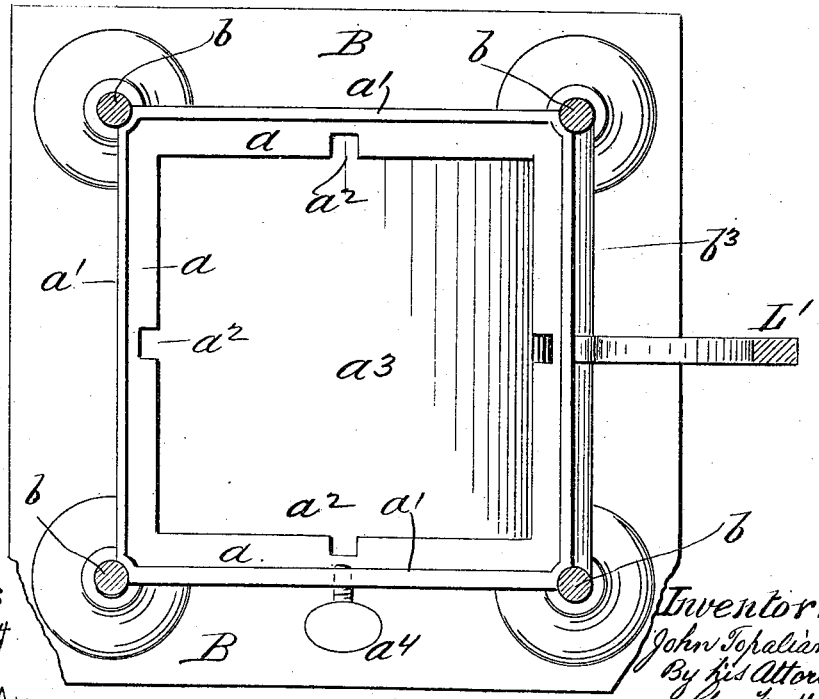
Fig. 3, is a horizontal section taken on a plane immediately below the pusher head, and also looking downward.
Figure 4:
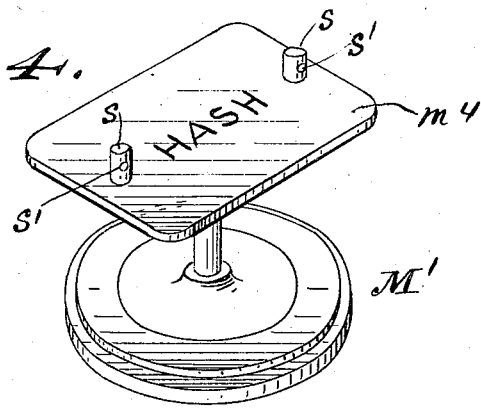
Fig. 4, is an isometrical perspective of the plunger used for "hashing," or mashing potatoes.
Figure 5:
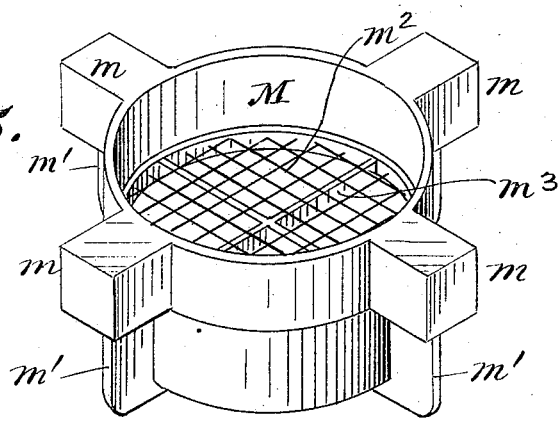
Fig. 5, is an isometrical view of the female sieve die used in connection therewith.
Figure 6:
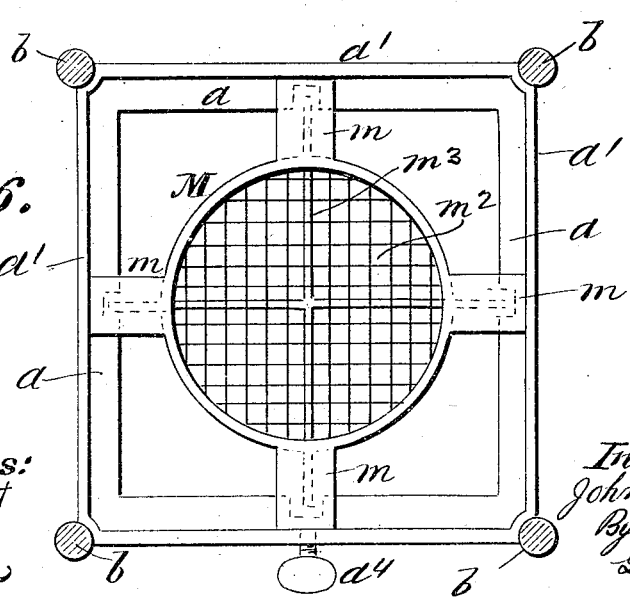
Fig. 6, is a top view of said sieve die seated in the press.

C, is the platen on the under side of which the male dies, forwarders, and strippers are mounted as required for use. This platen member C, is rigidly attached to the lower end of a push rod $c$, slidably mounted in the central bearing $b^2$, on the cross head $b'$, as shown more particularly in Fig. 1, the upper extremity of the said rod $c$, being provided with a knob or handle $c'$, by which it may be depressed manually if desired against the resistance of retractile springs $c^2$, $c^2$, (see Figs. 1, and 2) attached to the cross head $b'$, and to the platen member C. The platen member C, may also be depressed against the resistance of said retractile springs $c^2$, $c^2$, by means of a hand lever L, or equivalent mechanical expedient. The hand lever L, shown is fulcrumed on a link lever L', in turn fulcrumed on a rear cross rod $b^3$, (Fig. 3) so that the compound lever L, L', thus formed, can adapt itself readily to the vertical movement of the platen C, and rod $c$, which latter the hand lever L, straddles as shown in Fig. 2. Thus the depression of the hand lever L, forces the platen C, downward against the resistance of the springs $c^2$, which tend constantly to maintain said platen C, in its highest position above the die seat $a$, $a'$.

Figure 1:
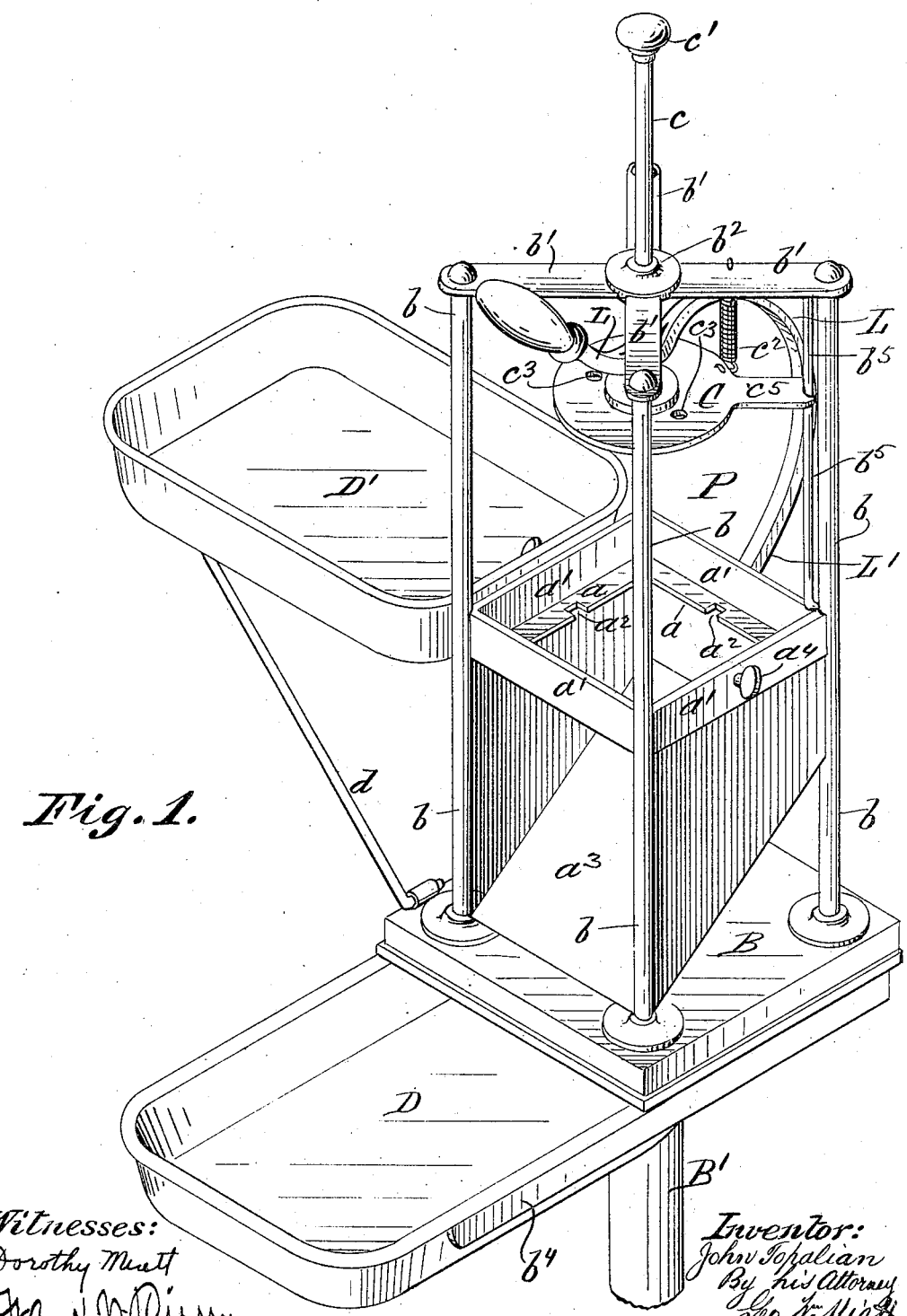
Figure 1, is an isometrical perspective of a hand press adapted to the practical requirements of my invention.

Below the female die seat $a$, $a'$, the space between the standards $b$, is inclosed at the rear and sides, and is formed with an inclined chute $a^3$, which directs the material from the dies to a receptacle D, supported for the purpose on arms $b^4$, (one of which is shown in Fig. 1) on either side of the table B. D', is a supply pan in which the potatoes may be stored temporarily in convenient position for introduction by hand into the press P,—said supply pan D', being supported on bracket rods $d$, (one of which is shown in Fig. 1,) or in any other desired or convenient manner.

$c^3$, $c^3$, are holes or sockets formed in the platen C, for the reception of the suspender studs $s$, $s$, on the back plates of the several male dies, etc., said suspender studs $s$, $s$, being formed with transverse holes $s'$, $s'$, for the reception of coupling pins $c^4$, $c^4$, by means of which said back plates may be secured to the under side of the platen C.

$a^4$, is a binding screw for holding the female dies rigidly on the seat $a$, $a'$, when desired. The platen C, is formed with arms $c^5$, $c^5$, the ends of which straddle the guide rods $b^5$, $b^5$, so as to prevent said platen from turning on its axis.

The female die M, is known as the "hash" former, and is used for boiled potatoes only, to make cream mashed potatoes and the like. It consists of a cylindrical receptacle formed with the lugs $m$, $m$, which rest on the seat shelf $a$, and with ribs $m'$, $m'$, which rest in the notches $a^2$, formed for them in said shelf seat $a$. Its bottom is in the form of a sieve of cross wires $m^2$, supported by the cross bars $m^3$. The boiled potatoes are placed within the cylindrical receptacle resting on the sieve bottom $m^2$, through which they are pressed by the plunger M', attached to the back plate $m^4$, secured to the under side of the platen C, by means of coupling pins $c^4$, $c^4$, inserted in the holes $s'$, in the suspender studs $s$, after the latter are passed through the holes $c^3$, $c^3$, formed for said studs $s$, in the platen plate C.

E, E', (Figs. 7, and 8) are the parallel blade dies or matrices designated respectively as No. 1, and No. 2. They consist each of a rectangular frame $e$, in which parallel blades $e'$, are mounted by any suitable means. In the construction shown in the drawings the ends of the blades $e'$, are attached to the hooked ends of screws $e^2$, on the outer ends of which are tightening nuts $e^3$. When the blades are drawn taut, their ends are set in a matrix $e^4$, of lead or other suitable alloy, so as to render the structure permanent. This construction is illustrated more particularly in Fig. 9.

The blades in each frame $e$, are spaced one half inch apart, but at intervening positions as related to the blades in the other frame, so that if used singly they form slices one half inch thick, but if imposed one upon the other as in Fig. 11, they form slices of approximately one fourth inch in thickness.

The frames $e$, are of a size to fit in the seat $a$, $a'$, of the press, in which they may be rigidly held by means of the set screw $a^4$. The potato is pushed through them by means of a male die or stripper $E^2$, consisting of a series of plates $e^5$, secured to a back plate $e^6$, provided with the usual suspender studs $s$, $s$, by which the stripper $E^2$, may be secured to the press platen C, in a manner hereinbefore set forth.

The lower edges of the plates $e^5$, are concavely curved to form a recess $e^7$. This is to adapt the device to the treatment of boiled potatoes as well as raw, the curved sides of the recess $e^7$, sustaining the cooked potato until sliced by being pressed through one or both of the dies E, E'.

Flanges $e^8$, $e^8$, on the ends of the die member $E^2$, limit its downward stroke by contacting with the side of the parallel blade die uppermost as supported on the press seat $a$, $a'$.

In conjunction with a modified form of male die or follower $E^4$, shown in Figs. 15, 16, and 17, these parallel blade dies E, E', may be utilized for the formation of what are technically known as "Frites," or "French fried" or "Pom Munite," i. e., the long rectangular strips, or the cubical form illustrated in Fig. 18. This is done by crossing the dies E, E', as supported on the press seat $a$, $a'$, as shown in Figs. 14, and 17, with the result that square matrices are formed by and between the blades $e'$, through which the potato is pressed by the pushers $e^9$, attached to the back plate $e^{10}$, provided with the suspender lugs $s$, $s$, for attachment to the press platen C, in the manner hereinbefore described. The pushers $e^9$, being each square in cross section readily pass through the square matrices formed by the crossed blades $e'$, of the die E, E', as shown in Fig. 17, thereby effectually stripping them and projecting the shaped potato through the press seat $a$, $a'$, into the chute or incline $a^3$, for delivery to the receiver D,—which in fact is the course of all products of the dies.

In the preparation of "Bardelaise" potato, formed from split oval potato cores, a female die F', shown in Figs. 19, 20, and 25, is used, in conjunction with a male die or follower $F^2$, shown in Figs. 21, to 24, inclusive. The female die F', is provided with a series of oval matrices $f$, $f$, formed by bent blades as shown in Fig. 19, and the oval core of potato is pressed through these matrices $f$, $f$, by concave strippers $f'$, $f'$, upon the lower ends of studs $f^2$, $f^2$, attached to the back plate $f^3$, of the male die $F^2$,—said back plate being formed with the usual suspender studs $s$, $s$, for attachment to the press platen C, as before described. The faces of the strippers $f'$, $f'$, are made concave to conform to the shape of the oval core made by the cutter F; and the shape of the resultant product is shown in Fig. 26.

The female die F', for "Bardelaise" potato is of course supported in the press upon the seat $a$, $a'$, as shown in Fig. 25, and it is formed with vertical flanges $f^4$, $f^4$, which limit the downward stroke of the male die $F^2$.

It is to be noted that the female die seat $a$, $a'$, is wide open centrally, so that while it affords ample support for the dies, the shaped potato products and the resultant trimmings are free to descend to the chute $a^3$. Also that the pressure on the reciprocatory platen C, and consequently on the male dies, etc., is entirely within the control of the operator, and that the retractile movement of said platen is automatic.

It will thus be seen that I provide adequate means for the formation of all the various shapes of potato service in vogue in hotels and restaurants of the higher grade, thus saving the time and cost involved in the cutting of such shapes by hand, while attaining greater uniformity in result. Furthermore the preparation of the products is accomplished in a much more sanitary manner.

What I claim as my invention and desire to secure by Letters Patent is,

1. Vegetable cutting apparatus of the character designated, comprising a base, standards rising therefrom, a die seat having flanges, frames having cutting dies therein removably supported on said flanges, a male die comprising a plurality of stripper plates, means for reciprocating said male die and its stripper plates, and flanges projecting beyond the ends of said die for contact with the frame of said dies to limit the downward stroke of the die.

2. In a device of the character described, a male die comprising a back plate having suspension studs, a plurality of stripper plates depending from the back plate, the lower edges of said plates being concavely curved to form a recess the sides of which serve to sustain the material until sliced.

JOHN TOPALIAN.

Witnesses:
 GEO. WM. MIATT,
 DOROTHY MIATT.